United States Patent
Su et al.

(10) Patent No.: US 9,193,858 B2
(45) Date of Patent: Nov. 24, 2015

(54) THERMOSET RESIN COMPOSITION AND ITS USE

(71) Applicant: Guangdong Shengyi Sci. Tech Co., Ltd., Dongguan, Guangdong (CN)

(72) Inventors: Minshe Su, Dongguan (CN); Yong Chen, Dongguan (CN); Guofang Tang, Dongguan (CN); Zhongqiang Yang, Dongguan (CN)

(73) Assignee: GUANGDONG SHENGYI SCI. TECH CO., LTD. (CN)

( * ) Notice: Subject to any disclaimer, the term of this patent is extended or adjusted under 35 U.S.C. 154(b) by 303 days.

(21) Appl. No.: 13/803,519

(22) Filed: Mar. 14, 2013

(65) Prior Publication Data

US 2014/0107256 A1 Apr. 17, 2014

(30) Foreign Application Priority Data

Oct. 16, 2012 (CN) .......................... 2012 1 0392713

(51) Int. Cl.
 *C08L 35/06* (2006.01)
 *C08L 63/00* (2006.01)
(52) U.S. Cl.
 CPC *C08L 35/06* (2013.01); *C08L 63/00* (2013.01)
(58) Field of Classification Search
 CPC .................................. C08L 63/00; C08L 35/06
 USPC ......................................................... 523/439
 See application file for complete search history.

(56) References Cited

U.S. PATENT DOCUMENTS

| 4,777,208 A | * | 10/1988 | Hefner, Jr. ................... 524/855 |
| 2007/0225414 A1 | * | 9/2007 | Bauer et al. .................. 524/115 |
| 2011/0278052 A1 | * | 11/2011 | Hsu ............................... 174/258 |
| 2014/0087152 A1 | * | 3/2014 | Nakamura et al. ......... 428/195.1 |

FOREIGN PATENT DOCUMENTS

| CN | 101928444 A | 12/2010 |
| CN | 101967264 A | 2/2011 |
| CN | 101967265 A | 2/2011 |
| CN | 101974208 A | 2/2011 |
| CN | 102051022 A | 5/2011 |
| CN | 102372900 A | 3/2012 |
| CN | 102443138 A | 5/2012 |
| CN | 102504201 A | 6/2012 |
| WO | WO 2012/165012 | * 12/2012 |

* cited by examiner

*Primary Examiner* — Megan McCulley
(74) *Attorney, Agent, or Firm* — Wilmer Cutler Pickering Hale and Dorr LLP

(57) ABSTRACT

The present invention discloses a thermoset resin composition including epoxy resin other than brominated epoxy resin, styrene maleic anhydride copolymer and additive-type flame retardant. The thermoset resin composition also includes an active ester. The thermoset resin composition is used to prepare resin sheet, resin coated copper, prepreg, laminate, copper clad laminate and printed wiring board, and so on. Said thermoset resin composition remarkably reduces the probability of delamination for the PCB laminate, and overcomes drawback of the tetrabromobisphenol A to introduce dielectric properties which will deteriorate the system. The obtained resin composition has good thermal stability and moisture-heat resistance, low dielectric constant and dielectric loss angle tangent, and good flame resistance.

15 Claims, No Drawings

THERMOSET RESIN COMPOSITION AND ITS USE

CROSS REFERENCE TO RELATED APPLICATIONS

This patent application is related and claims priority from earlier filed Chinese Patent Application No. 201210392713.8 filed Oct. 16, 2012.

TECHNICAL FIELD

The present invention relates to a resin composition. Specifically, the present invention relates to a thermoset resin composition and its application in resin sheet, resin coated metal, prepreg, laminated board, metal clad laminate and printed wiring board.

BACKGROUND

In recent years, in company with the developments of computers and information communication equipment to be in high performance, high functionalization and networking, the operation signal tend to be in high frequency in to achieve high speed transmission and treat large capacity of information, thus new requirements have been brought up for the material of circuit board to a developing direction of multilayer and high wiring density. These requirements comprise: 1, a good dielectric property (i.e., low dielectric constant and low dielectric loss factor), and capable to maintain stable under a condition of broad range of temperature and frequency; 2, be capable to tolerate the environmental impact of acid & alkali, high temperature and high humidity during the PCB process without moisture absorption and swelling so as to delamination and crack; 3, adapt to the process requirement of working and installation at high temperature; 4, have a good flame retardant security.

But, among the materials used in printed circuit board, adhesives mainly consisting of epoxy resin are widely employed. The dielectric constant and dielectric loss angle tangent in ordinary epoxy based laminate (FR-4 copper clad laminate) are currently high (dielectric constant 4.4, dielectric loss angle tangent about 0.02), and the high frequency characteristic is insufficient, so the ordinary epoxy based laminate is unadaptable for the requirement of high frequency signal. The skilled in the present art have employed curing agents with low polarity such as styrene maleic anhydride copolymer (SMA) or other low polarity curing agent to modify the epoxy resin for improving its high frequency dielectric property and thermal stability, in order to make the cured epoxy resin can satisfy the operational requirement as far as possible. Additionally, in order to achieve a good flame retardant property, the skilled in the art employ brominated epoxy resin which synthetized on the basis of TBBPA (tetrabromobisphenol A) to made the circuit board achieve a good flame retardant property.

Thereinafter, further discussions are proceeded with those research productions.

BE627887 discloses an epoxy resin composition using styrene maleic anhydride copolymer (SMA, its formula as follows) as epoxy resin crosslinking agent. The drawback of this epoxy resin composition is a poor thermal stability, which cause the composition unsuitable to be applied in substrate copper clad laminate for multilayer printer-circuit board (PCB).

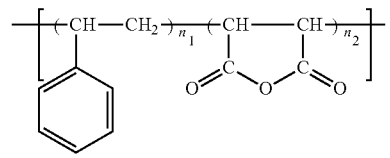

U.S. Pat. No. 6,509,414 uses FR-4 epoxy resin, styrene/maleic anhydride copolymer, brominated epoxy resin synthetized from tetrabromobisphenol A and tetrabromobisphenol A (TBBPA) to manufacture copper clad laminate U.S. Pat. No. 6,509,414 discloses that the FR-4 epoxy resin refers to brominated epoxy resin synthetized by tetrabromobisphenol A and bisphenol A-type epoxy resin, therefore U.S. Pat. No. 6,509,414 principally discloses the production of copper clad laminate using brominated epoxy resin synthetized by tetrabromobisphenol A. This patent employs tetrabromobisphenol A combined with styrene/maleic anhydride copolymer to form a mixed curing agent to overcome the drawback of low glass transition temperature when simply using styrene/maleic anhydride copolymer as epoxy resin curing agent. But, since there are two hydroxyl groups with very strong polarity in molecular structure of tetrabromobisphenol A, the introduction of tetrabromobisphenol A deteriorate to some extent the dielectric property of the system. In addition, because the bond energy of C—Br bond in molecular structure of tetrabromobisphenol A is low, thermal decomposition would happen from about 200° C. to release small molecule gas. Therefore, the tetrabromobisphenol A has a poor thermal stability. It may cause that the board would be liable to delaminate and crack during the followed work process of PCB laminate above 260° C., and has a risk of circuit malfunction.

U.S. Pat. No. 6,667,107 uses difunctional cyanate and its prepolymer, styrene maleic anhydride and its derivative, epoxy resin, etc., to manufacture a copper clad laminate composition with low dielectric constant and low dielectric loss factor. Said copper clad laminate composition employ cyanate resin and styrene maleic anhydride and its derivative together to improve the glass transition temperature to the epoxy resin system, and has a good high-frequency dielectric property. However, there are acid anhydride groups in molecular structure of the styrene maleic anhydride copolymer used in the system, this acid anhydride group can produce carboxyl group with poor thermal stability and moisture-heat resistance, while being used in combination with cyanate, which itself have a poor moisture-heat resistance, it can further deteriorate the moisture-heat resistance. Though the moisture-heat resistance property is improved to some extent by adding epoxy resin, the improvement is limited and cannot basically eliminate the drawback, thus in the PCB manufacturing process, the laminates are easily eroded by moisture to delaminate, which results in a very low product qualification rate.

Japanese Patent JP2012012534, China application for patent CN101967264, CN101967265, CN102443138, CN102504201 use active ester as curing agent of epoxy resin to manufacture PCB laminate having a good dielectric property.

China applications for patent CN101643571, CN101643572 utilize a solution without SMA to manufacture copper clad laminate.

DETAILED DESCRIPTION OF THE INVENTION

For solving above problems, the purpose of the present invention is to provide a thermoset epoxy resin composition containing SMA, said resin composition has good thermal stability and moist-heat resistance, low dielectric constant and dielectric loss angle tangent, and good flame retardance.

Said thermoset resin composition includes epoxy resin other than brominated epoxy resin, styrene maleic anhydride copolymer and additive-type flame retardant.

According to the present invention, the epoxy resin utilizes epoxy resin other than the brominated epoxy resin. It is well known that the common epoxy copper clad laminate mainly utilize tetrabromobisphenol A type epoxy resin to obtain required flame retardance property for circuit laminate. But after research, the inventor has found if utilize tetrabromobisphenol A or tetrabromobisphenol A type epoxy resin in the above thermoset composition, it is very possible to cause a problem of delamination for the multilayer PCB. The reason is that the bond energy of C—Br bond in tetrabromobisphenol A is very low, so thermal decomposition would happen about 200° C. to release small molecule gas such as HBr, whereas the lead free solder process generally used in the current PCB technology requires to conduct the operations such as wave-solder/reflow solder at 260° C., and under such a temperature, the circuit laminate mainly consists of tetrabromobisphenol A Type epoxy resin has a drawback of being liable to induce delamination of the multilayer PCB caused by the discharge of gas, thereby the scrap rate of circuit board is increased.

The inventor also find that the drawback of delamination occurs more often while utilizing styrene maleic anhydride copolymer (SMA) as curing agent for tetrabromobisphenol A type epoxy resin.

Preferably, the thermoset resin composition also includes an active ester. The inventor find that the probability of delamination for the PCB laminate can be reduced by employing active ester and SMA in combination as curing agent of brominated epoxy resin, Furthermore, in case of other epoxy resin other than the brominated epoxy resin the effect would be better. The functional groups in the structure of active ester are few, and the reactivity of chemical reaction is low. Therefore, a sufficient crosslink for the epoxy resin to cure requires a large amount of said active ester, a high curing temperature and a long curing time during the curing. Furthermore, the thermoset composition which using large amount active ester as curing agent of epoxy resin has a low glass transition temperature and its CTE (thermal expansion coefficient) will increase. But a coordinative utilization of active ester curing agent and SMA can obtain a good improvement.

The inventor also found that while the active ester curing agent is utilized in combination with SMA, compared to using SMA alone, the dielectric loss angle tangent of PCB laminate can be further reduced, from original 0.009~0.0012 to 0.004~0.007.

Preferably, the styrene maleic anhydride copolymer has the following formula:

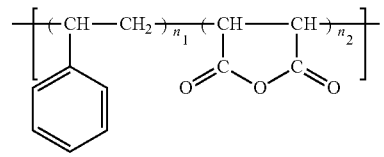

$n_1:n_2=0.8~19:1$, such as 1:1, 2:1, 3:1, 4:1, 5:1, 6:1, 7:1, 8:1, 9:1, 12:1, 15:1, 17:1, 18:1, preferably is 1~15:1, more preferably is 1~12:1.

Preferably, number-average molecular weight of the styrene maleic anhydride copolymer is 1000~50000, preferably is 1500~45000, more preferably is 2000~40000.

Except for brominated epoxy resin, all of other epoxy resins wherein 1 molecule of resin has two or more epoxide groups are capable to achieve the present invention. For instance, the resin are glycidyl ether type epoxy resin other than brominated epoxy resin, glycidyl ester type epoxy resin, glycidyl amine type epoxy resin, linear aliphatic epoxy resin, alicyclic epoxy resin. The glycidyl ester type epoxy resin comprises phthalic acid diglycidyl ester, tetrahydrophthalate glycidyl ester and hexahydrophthalic acid glycidyl ester, etc. Glycidyl amine type epoxy resin comprises 4,4-diamino-diphenylmethane tetra glycidyl amine (TGDDM) and triglycidyl para-aminophenol (TGPAP), etc. Alicyclic epoxy resin comprises ERL-4221, ERL-4221D and ERL-4299 from Dow Chemical. Said epoxy resins can be used alone, or be used after being blended.

Preferably, said epoxy resins are selected from one or a mixture of at least two of the following epoxy resins:

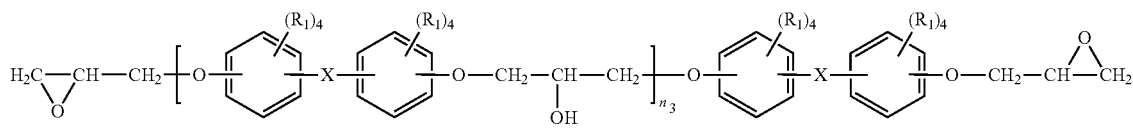

$R_1$ is selected from hydrogen atom, substituted or unsubstituted C1-C8 linear alkyl, substituted or unsubstituted C1-C8 branched alkyl, substituted or unsubstituted alicyclic alkyl, substituted or unsubstituted C1-C10 alkoxyl, substituted or unsubstituted phenyl; $n_3$ is any natural number; X is selected from any one of —$CH_2$—, —O—, —CO—, —$SO_2$—, —S—, —$CH(C_6H_5)$—, —$C(C_6H_5)_2$—, —$CH(CH_3)$—, —$C(CH_3)_2$—, or

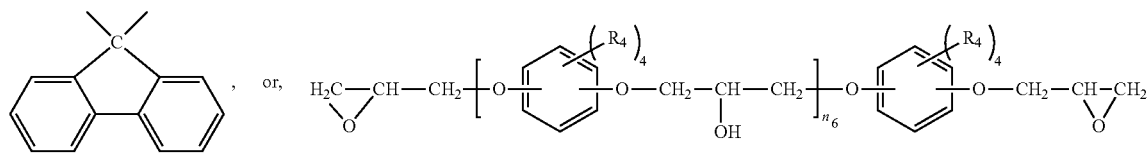

$R_4$ is selected from hydrogen atom, substituted or unsubstituted C1-C8 linear alkyl, substituted or unsubstituted C1-C8 branched alkyl, substituted or unsubstituted alicyclic alkyl, substituted or unsubstituted C1-C10 alkoxyl, substituted or unsubstituted phenyl; $n_6$ is any natural number;

or, One of or a mixture of two resins selected from phenolic novolac epoxy resin, methylphenolic novolac epoxy resin, bisphenol A type novolac epoxy resin, bisphenol F type epoxy resin, dicyclopentadiene epoxy resin, diphenyl epoxy resin, resorcinol type epoxy resin, naphthalene series epoxy resin, phosphorus-containing epoxy, silicon-containing epoxy, glycidyl amine type epoxy resin, alicyclic epoxy resin, polyethylene glycol type epoxy resin, tetra glycidyl ether of tetraphenolic ethane, triphenolic methane type epoxy resin. Said mixture is for instance mixture of methylphenol novolac epoxy resin and tetraglycidyl ether of tetraphenolic ethane, mixture of triphenolic methane type epoxy resin and polyethylene glycol type epoxy resin, mixture of resorcinol type epoxy resin and alicyclic epoxy resin, mixture of naphthalene series epoxy resin and diphenyl epoxy resin, mixture of bisphenol F type epoxy resin and bisphenol A type epoxy resin.

Preferably, said epoxy resins are selected from one or a mixture of at least two of epoxy resins with the following structures:

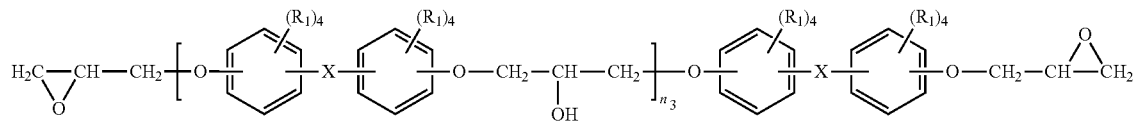

$R_1$ is selected from hydrogen atom, substituted or unsubstituted C1-C8 linear alkyl, substituted or unsubstituted C1-C8 branched alkyl, substituted or unsubstituted alicyclic alkyl, substituted or unsubstituted C1-C10 alkoxyl, substituted or unsubstituted phenyl; $n_3$ is any natural number; X is selected from any one of —$CH_2$—, —O—, —CO—, —$SO_2$—, —S—, —$CH(C_6H_5)$—, —$C(C_6H_5)_2$—, —$CH(CH_3)$—, —$C(CH_3)_2$—, or

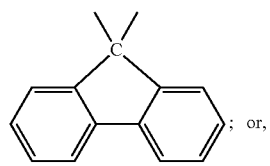; or,

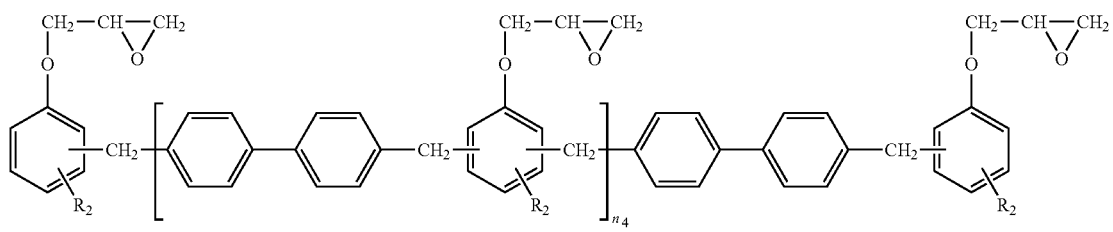

$R_2$ is selected from hydrogen atom, substituted or unsubstituted C1-C8 linear alkyl, substituted or unsubstituted C1-C8 branched alkyl, substituted or unsubstituted alicyclic alkyl, substituted or unsubstituted $C_1$-$C_{10}$ alkoxyl, substituted or unsubstituted phenyl; $0 \leq n_4 \leq 20$, and $n_4$ is an integer;

or,

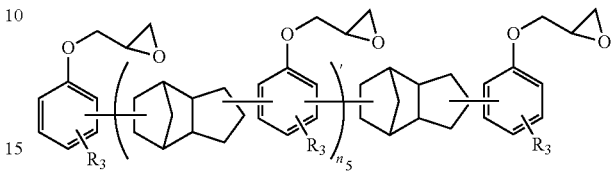

$R_3$ is selected from hydrogen atom, substituted or unsubstituted C1-C8 linear alkyl, substituted or unsubstituted C1-C8 branched alkyl, substituted or unsubstituted alicyclic alkyl, substituted or unsubstituted $C_1$-$C_{10}$ alkoxyl, substituted or unsubstituted phenyl; $0 \leq n_5 \leq 20$, and $n_5$ is an integer;

or,

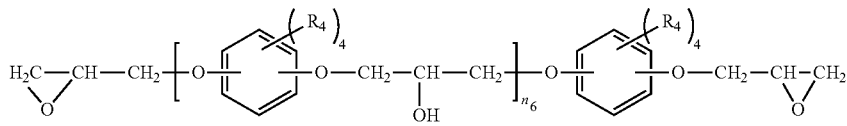

R₄ is selected from hydrogen atom, substituted or unsubstituted C1-C8 linear alkyl, substituted or unsubstituted C1-C8 branched alkyl, substituted or unsubstituted alicyclic alkyl, substituted or unsubstituted C1-C10 alkoxyl, substituted or unsubstituted phenyl; $n_6$ is any natural number;

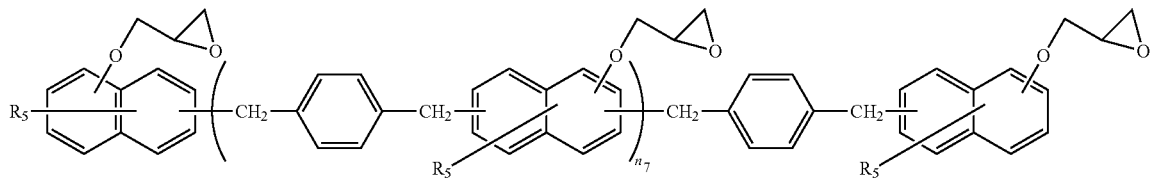

$R_5$ is selected from hydrogen atom, substituted or unsubstituted C1-C8 linear alkyl, substituted or unsubstituted C1-C8 branched alkyl, substituted or unsubstituted alicyclic alkyl, substituted or unsubstituted $C_1$-$C_{10}$ alkoxyl, substituted or unsubstituted phenyl; $0 \leq n_7 \leq 20$, and $n_7$ is an integer.

Preferably, the active ester has the following structure:

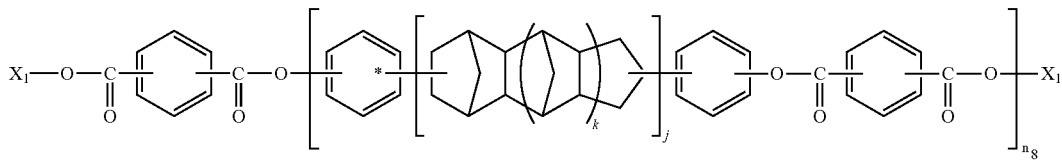

$X_1$ is phenyl or naphthyl, j is 0 or 1, $n_8$ is 0.25~1.25.

Preferably, the active ester comprises 3~40 wt % of the thermoset resin composition by mass, for example 5 wt %, 7 wt %, 9 wt %, 11 wt %, 15 wt %, 17 wt %, 19 wt %, 23 wt %, 25 wt %, 27 wt %, 29 wt %, preferably is 5~35% wt %, more preferably is 8~30 wt %.

Preferably, the mass ratio of said active ester to styrene maleic anhydride copolymer is 0.1~8:1, for example 0.5:1, 1:1, 2:1, 3:1, 4:1, 5:1, 6:1, 7:1, preferably 0.5~7:1, more preferably 1~6:1.

Preferably, mole ratio of the sum of ester groups in the active ester and anhydride groups in the styrene maleic anhydride copolymer to epoxide groups in the epoxy resin is 1:0.5~1.5, for example 1:0.6, 1:0.7, 1:0.8, 1:0.9, 1:1, 1:1.1, 1:1.2, 1:1.3, 1:1.4, Preferably 1:0.6~1.4, more preferably 1:0.8~1.2, thereby a PCB laminate with good over-all performances can be obtained.

During the research, the inventor also finds that by using organo-additive type flame retardant other than tetrabromobisphenol A, preferably by using halogen flame retardant (except for tetrabromobisphenol A) or/and phosphorus-based flame retardant, more preferably bromine series flame retardant or/and phosphorus-based flame retardant with a 5% thermal decomposition temperature of ≥300° C., The above organo-additive type flame retardant can also be utilized in coordination with inorganic flame retardant, the thermoset resin system is provided with good flame retardance and thermal stability.

Preferably, the bromine series flame retardant is selected from one or a mixture of at least two of decabromodiphenyl ether, brominated polystyrene, brominated polycarbonate, decabromodiphenylethane or ethylene bis(tetrabromophthalimide). The mixture is such as mixture of ethylene bis(tetrabromophthalimide) and decabromodiphenylethane, mixture of brominated polycarbonate and brominated polystyrene, mixture of decabromodiphenyl ether and ethylene bis(tetrabromophthalimide), mixture of decabromodiphenylethane, brominated polycarbonate and brominated polystyrene. The bromine series flame retardant can be used alone, or be used after being mixed, and a notable synergic effect can be obtained by a mixing application.

Preferably, the phosphorus-based flame retardant is selected from one or a mixture of at least two of tri(2,6-dimethyl phenyl)phosphine, tetrakis(2,6-dimethylphenyl)1, 3-phenylene bisphosphate, tetraphenyl resorcinol diphosphate, triphenyl phosphate, bisphenol A bis(diphenyl phosphate), phosphazene flame retardant, 10-(2,5-dihydroxyl phenyl)-10-hydro-9-oxa-10-phosphaphenanthrene-10-oxide, 10-(2,9-dihydroxyl naphthy)-10-hydro-9-oxa-10-phosphaphenanthrene-10-oxide or 9,10-dihydro-9-oxa-10-phosphaphenanthrene-10-oxide.

Inorganic flame retardants used coordinately with organic additive flame retardants are selected from one or mixture of at least two of red phosphor, aluminum hydroxide, magnesium hydroxide or antimony trioxide. For example, said mixture is mixture of antimony trioxide and magnesium hydroxide, mixture of aluminum hydroxide and red phosphorus, mixture of antimony trioxide and aluminum hydroxide, mixture of magnesium hydroxide and red phosphor, mixture of antimony trioxide, magnesium hydroxide and aluminum hydroxide, mixture of red phosphorus, antimony trioxide, magnesium hydroxide and aluminum hydroxide.

Preferably, the additive-type flame retardant comprises 5~30 wt % of the thermoset resin composition by mass, for example 7 wt %, 9 wt %, 11 wt %, 13 wt %, 15 wt %, 17 wt %, 19 wt %, 21 wt %, 23 wt %, 25 wt %, 27 wt %, 29 wt %, Preferably 10-30 wt %, more preferably 10-25 wt %.

Preferably, the thermoset resin also includes filler.

The thermal expansion coefficient of thermoset resin composition can be reduced by using filler, in order to decrease the probability of delamination for the laminated board and printed wiring board manufactured by the thermoset resin composition. At the same time, coordination with additive-type flame retardants other than tetrabromobisphenol A can also protect dielectric property of the composition from deterioration.

Preferably, the filler are selected from any one or mixture of at least two of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass micro-bead, potassium titanate fiber, carborundum single crystal filament, silicon nitride fibre, alumina single crystal fibre, staple glass fibre, polytetrafluorethylene powder, polyphenylene sulfide powder, or polystyrene powder. The mixture is for example mixture of aluminum hydroxide and magnesium hydroxide, mixture of kaolin hydrotalcite, mixture of calcium silicate and beryllium oxide, mixture of boron nitride and glass powder, mixture of and zinc borate, mixture of aluminum nitride and silicon nitride, mixture of carborundum and magnesium oxide, mixture of zirconium oxide and mullite, mixture of titanium oxide and potassium titanate, mixture of hollow glass microbead and potassium titanate single crystal filament, mixture of carborundum single crystal filament and silicon nitride single crystal filament, mixture of alumina single crystal filament and staple glass fibre, or mixture of polytetrafluorethylene powder and polyphenylene sulfide powder. The filler can be used alone, or be used after being mixed, and a notable synergic effect can be obtained by a mixing application.

Preferably, the filler comprise 5~60 wt % of the thermoset resin composition by mass, for example 12 wt %, 15 wt %, 18 wt %, 21 wt %, 25 wt %, 27 wt %, 32 wt %, 35 wt %, 38 wt %, 42 wt %, 45 wt %, 48 wt %, 52 wt %, 54 wt %, 56 wt %, 58 wt %, Preferably 15~55 wt %, more preferably 20~40 wt %.

Catalysts or/and solvents can also be added into the thermoset resin composition of the present invention.

Preferably, the catalysts are selected from one or mixture of at least two of tertiary amine, tertiary phosphine, quaternary ammonium salt, quaternary phosphinium salt or imidazole compounds.

Preferably, the tertiary amine is selected from one or an mixture of at least two of triethylanmine, tributylamine, dimethyl amine ethanol, N,N-dimethyl-pyridine amine or benzyl dimethyl amine.

Preferably, the tertiary phosphine is selected from triphenylphosphine or/and trialkyl phosphine.

Preferably, the quaternary ammonium salt is selected from any one or a mixture of at least two of tetramethyl ammonium bromide, tetramethyl ammonium chloride, tetramethylammonium iodide, benzyltrimethylammonium chloride, benzyltriethyl ammonium chloride or cetyl trimethylammonium bromide. The mixture is such as mixture of cetyl trimethylammonium bromide and benzyl triethyl ammonium chloride, mixture of benzyltrimethylammonium chloride and tetramethylammonium iodide, mixture of tetramethyl ammonium chloride and tetramethyl ammonium bromide, mixture of cetyl trimethylammonium bromide, benzyl triethyl ammonium chloride and benzyltrimethylammonium chloride, mixture of tetramethylammonium iodide, tetramethyl ammonium chloride and tetramethyl ammonium bromide.

Preferably, the quaternary phosphinium salt is selected from any one or a mixture of at least two of tetrabutyl phosphonium chlorine, tetrabutyl phosphonium bromide, tetrabutyl phosphonium iodide, tetraphenyl phosphonium chlorine tetraphenyl phosphonium bromide, tetraphenyl phosphonium iodide, ethyl triphenyl phosphonium chlorine, propyl triphenyl phosphonium chlorine, propyl triphenyl phosphonium bromide, propyl triphenyl phosphonium iodide, butyl triphenyl phosphonium chlorine, butyl triphenyl phosphonium bromide or butyl triphenyl phosphonium iodide. The mixture is such as mixture of butyl triphenyl phosphonium chlorine and propyl triphenyl phosphonium bromide, mixture of propyl triphenyl phosphonium chlorine and ethyl triphenyl phosphonium chlorine, mixture of tetraphenyl phosphonium iodide and tetraphenyl phosphonium bromide, mixture of tetraphenyl phosphonium chlorine and tetrabutyl phosphonium iodide, mixture of tetrabutyl phosphonium bromide and tetrabutyl phosphonium chlorine, mixture of butyl triphenyl phosphinium chlorine, propyl triphenyl phosphinium chlorine and tetraphenyl phosphonium iodide.

Preferably, the example of imidazole compounds is selected from 2-methylimidazol, 2-ethyl-4-methylimidazol, 2-phenyl imidazole, 2-undecyl imidazole, 1-benzyl-2-methylimidazol, 2-heptadecyl imidazole, 2-isopropyl imidazole, 2-phenyl-4-methylimidazol, 2-dodecyl imidazole or cyanoethyl-2-methylimidazol. The mixture is such as mixture of cyanoethyl-2-methylimidazole and 2-phenyl-4-methylimidazole, mixture of 2-isopropyl imidazole and 2-heptadecyl imidazole, mixture of 1-benzyl-2-methylimidazole and 2-undecyl imidazole, mixture of 2-phenyl imidazole and 2-ethyl-4-methylimidazole, mixture of 2-methylimidazole and 2-heptadecyl imidazole.

Amount of the catalyst used depends on the types of epoxy resin, curing agent and catalyst. A principle for utilization of the catalyst is to make gel time of the varnish not be lower than 120 s. The amount of catalyst in the present invention is 0.001~5.0 wt %, preferably 0.05~4.0 wt %, more preferably 0.05~3.0 wt % of total amount of the thermoset resin composition. Overdose of the catalyst (exceed 5.0 wt %) would result in a too rapid reactivity for the epoxy resin composition, it would cause production of byproduct and induce an adverse effect to the conversion uniformity of curing reaction; but, if amount of catalyst in the composition is lower than 0.001 wt %, the reactivity would become too slow and adverse to the manufacture of prepreg.

Preferably, the solvent is selected from one or a combination of at least two of ketones, hydrocarbons, ethers, esters or aprotic solvents, preferably one or mixture of at least two of acetone, methyl ethyl ketone, methyl isobutyl ketone, toluene, xylene, methanol, ethanol, primary alcohol, glycol mono-methyl ether, propylene glycol monomethyl ether, ethyl acetate, N,N-dimethyl formamide or N,N-diethyl formamide. The solvent can be used alone, or be used after being mixed, and a notable synergic effect can be obtained by a mixing application. Amount of the solvent can be determined according to viscosity of the selected resin, in order to achieve a moderate viscosity for the obtained epoxy resin varnish to facilitate curing, the present invention does not limit the specific addition amount.

Preferably, the thermoset resin composition further includes any one or mixture of at least two of polyphenylene oxide, cyanate resin or BT resin.

Preferably, the cyanate resin is prepared by any one or mixture of at least two of the following monomers, or any one or mixture of at least two of prepolymer of the following monomers, or a mixture of any one or mixture of at least two of the following monomers and any one or mixture of at least two of prepolymer of the following monomers: the monomers are bisphenol A type cyanate, 2,2-di(cyanotophenyl)propane, di(cyanotophenyl)ethane, di(cyanotophenyl)methane, di(4-cyanoto-3,5-dimethyl phenyl)methane, 2,2-di(4-cyanoto phenyl)hexafluoro propane, di(4-cyanotophenyl)thioether, phenol novolac type cyanate or cyanate containing dicyclopentadiene structure.

According to the present invention, more outstanding dielectric property and good processing performance, thermal stability, moisture resistance could be obtained while the thermoset resin composition contains polyphenylene oxide (PPO).

Preferably, the thermoset resin composition further includes any one or mixture of at least two of dye, pigment, surfactant, flatting agent, or ultraviolet absorber.

The terms of "include" and "comprise" in the present invention mean that except for said components, other components can be also included, those other components endue the thermoset resin composition different characteristic. Moreover, the terms of "include" and "comprise" can be replaced to an enclosed type expression of "is" or "consist of . . . ". No matter what components are included in the thermoset resin composition of the present invention, the sum of mass percentage of each component, other than the solvent, should be 100%.

The resin composition of the present invention is used to prepare resin sheet, resin coated metallic copper, prepreg, laminate, copper clad laminate and printed wiring board, and so on.

The second purpose of the present invention is to provide an application for the thermoset resin composition as mentioned above in preparation of resin sheet, resin coated metal and prepreg.

The method for preparing resin sheet from the thermoset resin composition of the present invention is recited as follows, but not limited in this context. Said thermoset resin composition is coated on a carrier film, the carrier film can be polyester film or polyimide film, in thickness of 5~150 µm, such as 10 µm, 15 µm, 20 µm, 25 µm, 30 µm, 35 µm, 40 µm, 45 µm, 50 µm, 55 µm, 60 µm, 70 µm, 80 µm, 90 µm, 100 µm, 105 µm, 110 µm, 115 µm. Then, the carrier film coated with thermoset resin composition is heated at 100~250° C. (for example 110° C., 120° C., 130° C., 140° C., 150° C., 160° C., 170° C., 180° C., 190° C., 200° C., 210° C., 220° C., 240° C.) for 10 s~30 min to for a sheet, for example, the heating can be maintained for 30 s, 60 s, 3 min, 5 min, 8 min, 11 min, 15 min, 18 min, 21 min, 24 min, 27 min, 29 min. The resin sheet formed thereby has a thickness of 5~100 µm, such as 10 µm, 15 µm, 20 µm, 25 µm, 30 µm, 35 µm, 40 µm, 45 µm, 50 µm, 55 µm, 60 µm, 70 µm, 80 µm, 90 µm, and so on.

The method for preparing resin coated metal from the thermoset resin composition of the present invention is recited as follows, but not only limited in this context. One or mixture of at least two of copper, brass, aluminum or nickel can be used as the metal foil, also, the metal foil can use alloy containing the above metals. Thickness of the metal foil is 5-150 µm, such as 10 µm, 15 µm, 20 µm, 25 µm, 30 µm, 35 µm, 40 µm, 45 µm, 50 µm, 55 µm, 60 µm, 70 µm, 80 µm, 90 µm, 100 µm, 105 µm, 110 µm, 115 µm. The thermoset resin composition is coated on the metal foil by handwork or mechanical roller coating. Then the metal foil coated with the thermoset resin composition is subjected to heat drying, to cause the thermoset resin composition to be in a partially cured state (B-Stage). Then, by curing at a temperature of 100-250° C. (for example 110° C., 120° C., 130° C., 140° C., 150° C., 160° C., 170° C., 180° C., 190° C., 200° C., 210° C., 220° C., 240° C.), and a heating time of 10 s-30 min (for example 30 s, 60 s, 3 min, 5 min, 8 min, 11 min, 15 min, 18 min, 21 min, 24 min, 27 min, 29 min), a resin coated metal is finally formed with a resin layer thickness of 1-150 µm. The resin coated copper (RCC) obtained by this method can serve as inner layer or outer layer of printed wiring board to build up the printed wiring board.

A process for manufacturing prepreg (partially cured sheet, prepreg) from thermoset resin composition of the present invention is recited as follows, but it should not limit the method for manufacturing prepreg. The thermoset resin composition is impregnated into reinforcing material, and the prepreg sheet impregnated with thermoset resin composition is subjected to heat drying, cause the thermoset resin composition in the prepreg sheet to a partially cured stage (B-Stage), then a prepreg is obtained. The heating temperature is 80~250° C., such as 90° C., 100° C., 110° C., 120° C., 130° C., 140° C., 150° C., 160° C., 170° C., 180° C., 190° C., 200° C., 210° C., 220° C., 230° C., 240° C., heating time is 1~30 min, such as 3 min, 5 min, 7 min, 10 min, 13 min, 16 min, 19 min, 22 min, 25 min, 28 min, 29 min. The reinforcing material used therein can be inorganic or organic material. The specifiable inorganic material comprises woven fabric or non-woven fabrics or paper of glass fiber, carbon fiber, boron fibre, metal and so on, wherein the glass fibre cloth or non-woven fabrics can be E-glass, Q type cloth, NE cloth, D-type cloth, S type cloth, high silicon oxygen cloth and so on. The organic fiber comprises woven or non-woven fabrics or paper made of polyester, polyamine, polyacrylic acid, polyimide, aramid polytetrafluorethylene, syndiotactic polystyrene and so on. But the reinforcing material is not limited to these, other reinforcing materials can be used to reinforce resin can also achieve the present invention. The resin content in the prepreg is 25~70 wt %.

The third propose of the present invention relates to provide an usage of resin sheet, resin coated metal and prepreg on fabrication of laminate, metal clad laminate and printed wiring board, preferably the usage of the prepreg on fabrication of laminate, copper clad laminate and printed wiring board.

Laminate, copper clad laminate, printed wiring board can be prepared by using aforesaid resin sheet, resin coated metal and prepreg.

Method for preparing laminate by using the prepreg of the present invention is shown as follows: at least two layers of prepreg are stacked, and subject to a hot-press at 130~250° C. and a pressure of 3~50 kgf/cm$^2$ for 60~240 min to form a laminated body, then a laminate is obtained. The hot-press temperature is 130~250° C., such as 140° C., 150° C., 160° C., 170° C., 180° C., 190° C., 200° C., 210° C., 220° C., 230° C., 240° C. The pressure is 3~50 kgf/cm$^2$, such as 5 kgf/cm$^2$, 8 kgf/cm$^2$, 11 kgf/cm$^2$, 14 kgf/cm$^2$, 17 kgf/cm$^2$, 24 kgf/cm$^2$, 28 kgf/cm$^2$, 32 kgf/cm$^2$, 37 kgf/cm$^2$, 42 kgf/cm$^2$, 45 kgf/cm$^2$, 48 kgf/cm$^2$. The hot-press time is 60~240 min, such as 70 min, 90 min, 110 min, 130 min, 150 min, 170 min, 190 min, 210 min, 230 min, 240 min.

Method for preparing metal clad laminate by using prepreg of the present invention is shown as follows: one or more of the prepreg is tailored to a certainty size and after being stack, the prepreg is sent to a laminating device to conduct a lamination. At the same time, metal foil is placed on one side or both sides of the prepreg, then by means of thermoforming, the prepreg is suppressed to form a metal clad laminate. One or mixture of at least two of copper, brass, aluminum or nickel can be used as the metal foil, also, the metal foil can use alloy containing the above metals. As to pressing conditions of the laminated board, a suitable laminating curing condition should be selected according to the practical situation of epoxy resin composition. If laminating pressure is too low, cavity within the laminated board would be caused and its electrical property may decline; And if the laminating pressure is too high, there may be excessive internal stress within the laminated board, which may cause dimensional stability of the laminated board decline, all of these require an appropriate pressure which can satisfy moulding to suppress the board for fulfilling the requirement. A general guiding principle for conventional suppress laminated board is: at a laminating temperature of 130~250° C., pressure: 3-50 kgf/cm$^2$, hot-press time: 60-240 min. the hot-press temperature is 130~250° C., for example 140° C., 150° C., 160° C., 170° C., 180° C., 190° C., 200° C., 210° C., 220° C., 230° C., 240° C. The pressure is 3~50 kgf/cm$^2$, for example 5 kgf/cm$^2$, 8 kgf/cm$^2$, 11 kgf/cm$^2$, 14 kgf/cm$^2$, 17 kgf/cm$^2$, 24 kgf/cm$^2$, 28 kgf/cm$^2$, 32 kgf/cm$^2$, 37 kgf/cm$^2$, 42 kgf/cm$^2$, 45 kgf/cm$^2$, 48 kgf/cm$^2$. The hot-press time is 60~240 min, for example 70 min, 90 min, 110 min, 130 min, 150 min, 170 min, 190 min, 210 min, 230 min, 240 min.

A printed wiring board or a multi-layer circuit board can be prepared by using additive process or substractive process from resin sheet, resin coated metal, prepreg and metal clad laminate. The method using prepregs of the present invention to prepare printed wiring board is shown as follows: utilizing the preparation method as mentioned above to obtain metal clad laminate, and manufacturing printed wiring board or complicated multilayer circuit board by additive process or substractive process.

The thermoset resin composition varnish is liquid varnish obtained by adding solvent to said composition and conducting a solvent adjustment.

In addition to resin sheet, resin coated metal, prepreg, laminate, metal clad laminate and printed wiring board, said thermoset resin composition can also be used to prepare adhesive and paint, or be used in buildings, aviation, watercraft and automotive industry.

Compared with the existing technology, the present invention has the following advantageous effect:

The present invention selects epoxy resins other than brominated epoxy resin, SMA and active ester in coordination as curing agent, and selects additive-type flame retardant other than tetrabromobisphenol A, Significantly reduces the probability of delamination for the PCB laminate, and overcomes drawback of the tetrabromobisphenol A to introduce dielectric properties which will deteriorate the system. The obtained resin composition has good thermal stability and moisture-hot resistance, low dielectric constant and dielectric loss angle tangent, and good flame retardance.

EMBODIMENTS

In order to demonstrate the present invention and understand the technical solution of present invention, typical and non-limited examples of the present invention are as follows:

Example 1

20.5 parts of SMA3000 styrene maleic anhydride copolymer, 12 parts of active ester, 32.5 parts of N695, 15 parts of BT93 (ethylene bis(tetrabromo-phthalic imidine)), 20 parts of SC2050 MB are used and prompted by catalyst 2-MI (2-methylimidazol), the above compounds are dissolved by using MEK (butanone), and modulated to varnish with suitable viscosity. This varnish is impregnated into 2116 type electronic grade glass fabric, and the solvent is removed in an oven at 155° C., then a prepreg sample of B-stage is obtained. The parts in mass of said SMA, active ester, N695, BT93 and SC2050MB sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Example 2

27.5 parts of EF60, 5 parts of active ester, 32.5 parts of HP7200, 15 parts of BT93 20 parts of SC2050MB are used and prompted by catalyst 2-MI, the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said EF60, active ester, HP7200, BT93 and SC2050MB sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Example 3

5 parts of SMAEF60, 27.5 parts of active ester, 32.5 parts of HP7200, 15 parts of BT93, 20 parts of SC2050MB are used and prompted by catalyst 2-MI, the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said EF60, active ester, HP7200, BT93 and SC2050MB sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Example 4

15 parts of SMA4000 styrene maleic anhydride copolymer, 10 parts of active ester, 15 parts of HF-10, 25 parts of N695, 15 parts of HP3010, 20 parts of SC2050MB are used and prompted by catalyst 2-MI and zinc dioctanoate, the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said SMA, active ester, HF-10, N695, BT93 and SC2050MB sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Example 5

30 parts of SMA1000 styrene maleic anhydride copolymer, 3 parts of active ester, 32 parts of EPPN501H epoxy resin, 30 parts of SAYTEX8010 decabromodiphenyl ethane and 5 parts of kaolin are used and prompted by catalyst N,N-dimethyl-pyridine amine, the above compounds are dissolved by using toluene, and modulated to varnish with suitable viscosity. This varnish is impregnated into non-woven polyester, and the solvent is removed in an oven at 155° C., then a prepreg sample of B-stage is obtained. The parts in mass of said SMA, active ester, EPPN501H epoxy resin, decabromodiphenyl ethane, and kaolin sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Example 6

5 parts of SZ08250 styrene maleic anhydride copolymer, 40 parts of active ester, 11.5 parts of AG-80 epoxy resin, 28 parts of hollow glass microbead, 5 parts of SPB100, 10.5 parts of PTFE powder are used and prompted by catalyst Butyl triphenyl phosphine chloride, the above compounds are dissolved by using DMF, and modulated to varnish with suitable viscosity. This varnish is impregnated into 2116 type electronic grade glass fabric, and the solvent is removed in an oven at 155° C., then a prepreg sample of B-stage is obtained. The parts in mass of said SMA, active ester, AG-80 epoxy resin, hollow glass microbead, SPB100 and PTFE powder sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Comparative Example 1

21 parts of SMA3000 styrene maleic anhydride copolymer, 18 parts of EPICLON153, 15 parts of tetrabromobisphenol A, 46 parts of DER530 are used and prompted by catalyst 2-MI, the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said SMA, active ester, and tetrabromobisphenol A sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Comparative Example 2

40 parts of SMA3000 styrene maleic anhydride copolymer, 60 parts of DER530 are used and prompted by catalyst 2-MI, the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said SMA and DER530 sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Comparative Example 3

40 parts of active ester, 60 parts of N695 are used and prompted by catalyst the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said active ester and N695 sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

Comparative Example 4

3 parts of SMA3000 styrene maleic anhydride copolymer, 27.5 parts of active ester, 34.5 parts of N695, 15 parts of BT93, 20 parts of SC2050MB are used and prompted by catalyst 2-MI and zinc dioctanoate, the above compounds are dissolved by using MEK, and modulated to varnish with suitable viscosity. This varnish is impregnated into 2116 type electronic grade glass fabric, and the solvent is removed in an oven at 155° C., then a prepreg sample of B-stage is obtained. The parts in mass of said SMA, active ester, N695, BT93 and SC2050MB sum up to 100 parts.

Eight sheets of prepreg and two sheets of 1 Ounce-electrolytic copper foil are folded together, and laminated by thermocompressor to obtain a laminated board with both of its two sides are covered by copper foils. Condition of the lamination is as follows: 1. The heating up speed is controlled between 1.0 to 3.0° C./min while the temperature of feedstock is in the range of 80-120° C.; 2. The pressure is 20 kg/cm$^2$; 3. The curing temperature is 190° C. and said temperature is maintained for 90 minutes. The corresponding properties are shown in Table 1.

TABLE 1

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| DER530 |  |  |  |  |  |  | 46 | 60 |  |  |
| tetrabromobisphenol A |  |  |  |  |  |  | 15 |  |  |  |
| N695 | 32.5 |  |  | 25 |  |  |  |  | 60 | 34.5 |
| EPICLON153 |  |  |  |  |  |  | 18 |  |  |  |
| HP7200 |  | 32.5 | 32.5 |  |  |  |  |  |  |  |
| AG-80 |  |  |  |  |  | 11.5 |  |  |  |  |
| EPPON501H |  |  |  |  | 32 |  |  |  |  |  |
| Active ester | 12 | 5 | 27.5 | 10 | 3 | 40 |  |  | 40 | 27.5 |
| SMA1000 |  |  |  |  | 30 |  |  |  |  |  |
| SZ08250 |  |  |  |  |  | 5 |  |  |  |  |
| SMA4000 |  |  |  | 15 |  |  |  |  |  |  |
| SMA3000 | 20.5 |  |  |  |  |  | 21 | 40 |  | 3 |
| SMAEF60 |  | 27.5 | 5 |  |  |  |  |  |  |  |
| HF-10 |  |  |  | 15 |  |  |  |  |  |  |
| SAYTEX8010 |  |  |  |  | 30 |  |  |  |  |  |
| BT93 | 15 | 15 | 15 |  |  |  |  |  |  | 15 |
| HP3010 |  |  |  | 15 |  |  |  |  |  |  |
| SPB100 |  |  |  |  |  | 5 |  |  |  |  |
| SC2050MB | 20 | 20 | 20 | 20 |  |  |  |  |  | 20 |
| kaolin |  |  |  |  | 5 |  |  |  |  |  |
| Hollw glass bead |  |  |  |  |  | 28 |  |  |  |  |
| PTFE powder |  |  |  |  |  | 10.5 |  |  |  |  |
| N, N-dimethyl-pyridine amine |  |  |  |  | q.s. |  |  |  |  |  |
| Butyl triphenyl phosphine chloride |  |  |  |  |  | q.s. |  |  |  |  |
| zinc naphthenate |  |  |  | q.s. |  |  |  |  |  |  |
| 2-MI | q.s. | q.s. | q.s. | q.s. |  |  | q.s. | q.s. | q.s. | q.s. |
| toluene |  |  |  |  | 80 |  |  |  |  |  |
| DMF |  |  |  |  |  | 80 |  |  |  |  |
| MEK | 70 | 70 | 70 | 70 |  |  | 80 | 30 | 90 | 90 |
| Tg (° C.) | 171 | 165 | 158 | 208 | 187 | 175 | 168 | 138 | 135 | 133 |
| dielectric constant | 3.9 | 3.7 | 3.6 | 3.6 | 3.6 | 3.7 | 4.1 | 4.0 | 3.9 | 3.9 |
| dielectric loss factor | 0.004 | 0.006 | 0.005 | 0.005 | 0.0065 | 0.004 | 0.013 | 0.015 | 0.0085 | 0.006 |
| Soldering resistance | good | good | good | good | good | good | bubbling | delamination | good | good |
| PCT water absorption (mass %) | 0.28 | 0.32 | 0.27 | 0.26 | 0.28 | 0.29 | 0.40 | 0.38 | 0.38 | 0.33 |
| Soldering resistance after PCT (S) | >300 | >300 | >300 | >300 | >300 | >300 | >300 | 160 | >300 | >300 |
| dielectric constant | V0 | V0 | V0 | V0 | V0 | V0 | V0 | V0 | burning to holder | V0 |
| Td | 378 | 389 | 378 | 382 | 381 | 378 | 339 | 338 | 386 | 376 |
| CTE (ppm, >Tg) | 213 | 220 | 230 | 225 | 232 | 226 | 265 | delamination | 280 | 231 |

Mark 1:

Amount of each component in Table 1 is calculated by mass part;

DER530 is bisphenol A type brominated difunctional epoxy resin from DOW;

N695 is o-cresol novolac epoxy resin from DIC;

EPICLON153 is tetrabromobisphenol A modified brominated epoxy resin from DIC;

HP7200 is dicyclopentadiene epoxy resin from DIC;

AG-80 is epoxy produced by Shanghai Synthetic Material Institute;

EPPON501H is tri-functional epoxy resin produced by Nippon Kayaku;

SZ08250 is styrene maleic anhydride copolymer produced by Polyscope Polymer Corporation;

SMA1000 is styrene maleic anhydride copolymer from Sartomer;

SMA3000 is styrene maleic anhydride copolymer from Sartomer;

SMA4000 is styrene maleic anhydride copolymer from Sartomer;

SMAEF60 is styrene maleic anhydride copolymer from Sartomer;

HF-10 is bisphenol A type difunctional cyanate from Huifengkemao Co., Ltd.;

SC2050MB is silica from admatechs corporate;

BT93 is ethylene bis(tetrabromophthalimide) produced by Allbemarle;

HP3010 is brominated polystyrene produced by Allbemarle;

SPB100 is phosphazene flame retardant produced by Otsuka Chemical Co., Ltd.;

SAYTEX8010 is decabromodiphenyl ethane from Allbemarle;

Kaolin is produced by BASF;

Hollow glass microbead is produced by 3M Corporation;

TABLE 1-continued

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |

PTFE powder is from Shanghai 3F New Material Co., Ltd.

Mark 2:

Glass transition temperature (Tg): measured by DSC, according to the DSC testing method provided by IPC-TM-650 2.4.25.

Peel strength is tested according to experiment condition of "post -thermal stress" in the IPC-TM-650 2.4.8 method.

Dielectric constant and dielectric loss factor: tested according to the method regulated by IPC-TM-650 2.5.5.9.

Evaluation to the soldering resistance: copper clad laminate is impregnated in a tin furnace at a temperature of 288° C. for 20 seconds, then taken out and cooled down to room temperature, and the laminated board is impregnated into the tin furnace again, then the procedure is repeated for 5 times, the soldering resistance is evaluated by observing the appearance of the laminated board.

Measurement for PCT water absorption: copper clad laminate is impregnated in copper etching solution to remove the copper foil in the surface to evaluate the laminate. The laminate is placed in a pressure cooker, after a treatment for 2 hours at 121° C. and 2 atm, water absorption of the laminate is measured.

Evaluation to soldering resistance after PCT: copper clad laminate is impregnated in copper etching solution to remove the copper foil in the surface to evaluate the laminate. The laminate is placed in a pressure cooker, after a treatment for 2 hours at 121° C. and 2 atm, Impregnated in a tin furnace at a temperature of 288° C. While the base material shows bubbling or cracking, the corresponding time is recorded. If the base material does not show bubbling or delamination after 5 minutes, the evaluation can be finished.

Td: copper clad laminate is impregnated in copper etching solution to remove the copper foil in the surface to evaluate the laminate. The laminate is measured by using thermogravimetic analyzer (TGA), heating up at 10° C./minute under nitrogen atmosphere, to reach a temperature of 5% weight loss.

CTE: using TMA test, heating up speed is 10° C./min.

Combustibility is measured according to UL-94 testing method.

As shown in Table 1, the Examples 1-6 of the present invention have achieved low dielectric constant and a low dielectric loss factor, and the thermal stability, soldering resistance, moisture resistance and moisture-heat resistance are all good. On the other hand, the dielectric loss factor of the Comparative Example 1 is too high, and its thermal expansion coefficient (CTE) is too large; the Comparative Example 2 shows a delamination during the test of CTE; the CTE of comparative Example 3 is too large and the glass transition temperature is too low, V0 cannot be reached during the flammability test; and the glass transition temperature of Comparative Example 4 is too low.

Applicant declares that detail methods of the present invention are demonstrated by the above examples, but the present invention should not be restricted to the above detail methods, i.e., it is not means that the present invention must depend on the above detail method to carry out. The skilled in the art should understand that any improvement to the present invention, equivalent replacement to each stock for the product of the present invention, addition of auxiliary components, selection of specific manner, and so on, are all within the protection scope and disclosure scope of the present invention.

We claim:

1. A thermoset resin composition, characterized in that said thermoset resin composition comprises epoxy resin other than brominated epoxy resin, styrene maleic anhydride copolymer and additive flame retardant; wherein said thermoset resin composition further comprises an active ester and the mass ratio of said active ester to styrene maleic anhydride copolymer is from 0.1:1 to 8:1.

2. The thermoset resin composition according to claim 1, characterized in that the mole ratio of the sum of ester groups in the active ester and anhydride groups in the styrene maleic anhydride copolymer to epoxide groups in the epoxy resin is from 1:0.5 to 1:1.5.

3. The thermoset resin composition according to claim 1, characterized in that said styrene maleic anhydride copolymer has the following formula:

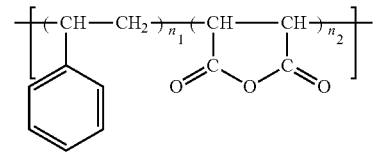

$n_1:n_2=0.8\sim19:1$, optionally, said styrene maleic anhydride copolymer has a number-average molecular weight of 1000~50000.

4. The thermoset resin composition according to claim 1, characterized in that said epoxy resin is selected from the group consisting of the following epoxy resins and a mixture of at least two of them:

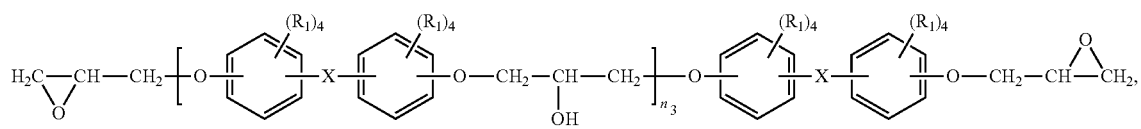

$R_1$ is selected from the group consisting of hydrogen atom, substituted or unsubstituted C1-C8 linear alkyl, substituted or unsubstituted C1-C8 branched alkyl, substituted or unsubstituted alicyclic alkyl, substituted or unsubstituted C1-C10 alkoxyl, and substituted or unsubstituted phenyl; $n_3$ is any natural number; X is selected from the group consisting of —$CH_2$—, —O—, —CO—, —$SO_2$—, —S—, —$CH(C_6H_5)$—, —$C(C_6H_5)_2$—, —$CH(CH_3)$—, —$C(CH_3)_2$—, and

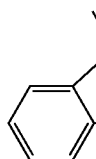; or

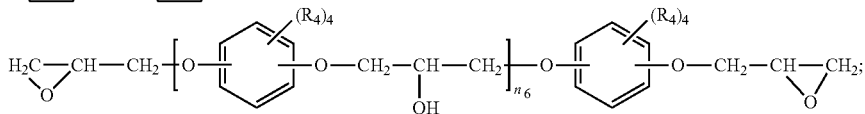

R$_4$ is selected from the group consisting of hydrogen atom, substituted or unsubstituted C$_1$-C$_8$ linear alkyl, substituted or unsubstituted C$_1$-C$_8$ branched alkyl, substituted or unsubstituted alicyclic alkyl, substituted or unsubstituted C$_1$-C$_{10}$ alkoxyl, and substituted or unsubstituted phenyl; n$_6$ is any natural number;

or, one of or a mixture of two resins selected from the group consisting of phenolic novolac epoxy resin, methylphenolic novolac epoxy resin, bisphenol A novolac epoxy resin, bisphenol F epoxy resin, dicyclopentadiene epoxy resin, diphenyl epoxy resin, resorcinol epoxy resin, naphthalene series epoxy resin, phosphorus-containing epoxy, silicon-containing epoxy, glycidyl amine epoxy resin, alicyclic epoxy resin, polyethylene glycol epoxy resin, tetraphenol ethane tetraglycidyl ether, and triphenolic methane epoxy resin.

5. The thermoset resin composition according to claim 1, characterized in that said epoxy resin is one epoxy resin or a mixture at of least two epoxy resins selected from the group consisting of compounds of the following structure:

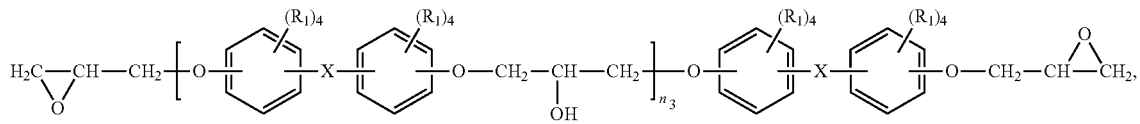

R$_1$ is selected from the group consisting of hydrogen atom, substituted or unsubstituted C$_1$-C$_8$ linear alkyl, substituted or unsubstituted C$_1$-C$_8$ branched alkyl, substituted or unsubstituted alicyclic alkyl, substituted or unsubstituted C$_1$-C$_{10}$ alkoxyl, and substituted or unsubstituted phenyl; n$_3$ is any natural number; X is selected from the group consisting of —CH$_2$—, —O—, —CO—, —SO$_2$—, —S—, —CH(C$_6$H$_5$)—, —C(C$_6$H$_5$)$_2$—, —CH(CH$_3$)—, —C(CH$_3$)$_2$—, and

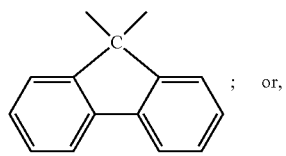; or,

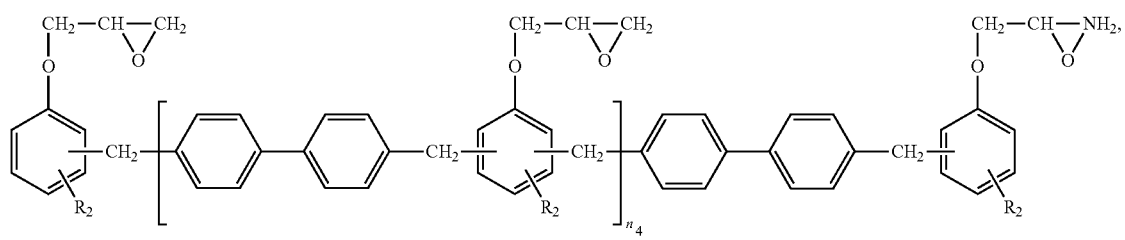

R₂ is selected from the group consisting of hydrogen atom, substituted or unsubstituted $C_1$-$C_8$ linear alkyl, substituted or unsubstituted $C_1$-$C_8$ branched alkyl, substituted or unsubstituted alicyclic alkyl, substituted or unsubstituted $C_1$-$C_{10}$ alkoxyl, and substituted or unsubstituted phenyl; $0 \leq n_4 \leq 20$, and $n_4$ is an integer;

or,

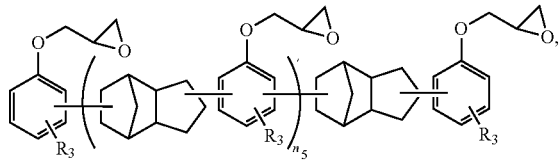

R₃ is selected from the group consisting of hydrogen atom, substituted or unsubstituted $C_1$-$C_8$ linear alkyl, substituted or unsubstituted $C_1$-$C_8$ branched alkyl, substituted or unsubstituted alicyclic alkyl, substituted or unsubstituted $C_1$-$C_{10}$ alkoxyl, and substituted or unsubstituted phenyl; $0 \leq n_5 \leq 20$, and $n_5$ is an integer;

or,

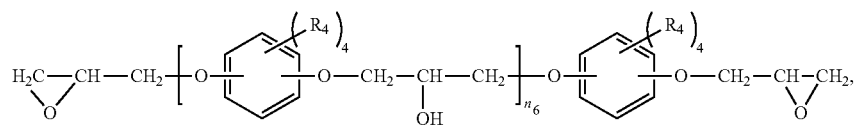

R₄ is selected from the group consisting of hydrogen atom, substituted or unsubstituted $C_1$-$C_8$ linear alkyl, substituted or unsubstituted $C_1$-$C_8$ branched alkyl, substituted or unsubstituted alicyclic alkyl, substituted or unsubstituted $C_1$-$C_{10}$ alkoxyl, and substituted or unsubstituted phenyl; $n_6$ is any natural number;

or

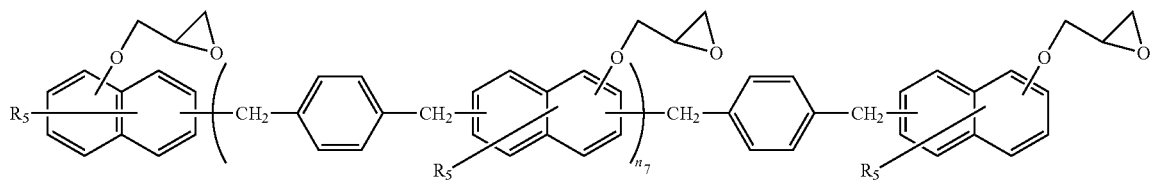

R₅ is selected from the group consisting of hydrogen atom, substituted or unsubstituted $C_1$-$C_8$ linear alkyl, substituted or unsubstituted $C_1$-$C_8$ branched alkyl, substituted or unsubstituted alicyclic alkyl, substituted or unsubstituted $C_1$-$C_{10}$ alkoxyl, and substituted or unsubstituted phenyl; $0 \leq n_7 \leq 20$, and $n_7$ is an integer.

6. The thermoset resin composition according to claim 1, characterized in that said active ester has the following structure:

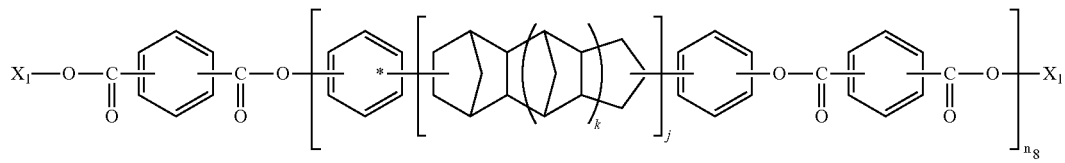

$X_1$ is phenyl or naphthyl, k is 0 or 1, j is 0 or 1, and $n_8$ is 0.25~1.25, optionally, said active ester comprises 3~40 wt % of the thermoset resin composition by mass.

7. The thermoset resin composition according to claim 1, characterized in that said additive flame retardant is selected from the group consisting of organo-additive flame retardants other than tetrabromobisphenol A, optionally, said additive flame retardant is selected from the group consisting of halogen flame retardant, and phosphorus-based flame retardant, optionally, said additive flame retardant is selected from the group consisting of bromine series flame retardant and phosphorus-based flame retardant having a 5% thermal decomposition temperature ≥300° C., optionally, said bromine series flame retardant is selected from the group consisting of one or a mixture of at least two of decabromodiphenyl ether, brominated polystyrene, brominated polycarbonate, decabromodiphenylethane and ethylene bis(tetrabromophthalimide), optionally, said phosphorus-based flame retardant is selected from the group consisting of one or a mixture of at least two of tri(2,6-dimethyl phenyl)phosphine, tetrakis(2,6-dimethylphenyl) 1,3-phenylene bisphosphate, tetraphenyl resorcinol diphosphate, triphenyl phosphate, bisphenol A bis(diphenyl phosphate), phosphazene flame retardant, 10-(2,5-dihydroxyl phenyl)-10-hydro-9-oxa-10-phospha phenanthrene-10-oxide, 10-(2,9-dihydroxynaphthyl)-10-hydro-9-oxa-10-phosphaphenanthrene-10-oxide or 9, and 10-dihydro-9-oxa-10-phosphaphenanthrene-10-oxide, optionally, said additive flame retardant comprises 5-30 wt % of the thermoset resin composition by mass.

8. The thermoset resin composition according to claim 1, characterized in that said thermoset resin composition further comprises filler, optionally, said filler is selected from the group consisting of any one or mixture of at least two of aluminum hydroxide, magnesium hydroxide, kaolin, talcum, hydrotalcite, calcium silicate, beryllium oxide, boron nitride, glass powder, silica powder, zinc borate, aluminum nitride, silicon nitride, carborundum, magnesium oxide, zirconium oxide zirconium oxide, mullite, titanium oxide, potassium titanate, hollow glass microbead, potassium titanate fiber, carborundum single crystal filament, silicon nitride fibre, alumina single crystal fibre, staple glass fibre, polytetrafluorethylene powder, polyphenylene sulfide powder, and polystyrene powder, optionally, said filler comprise 5~60 wt % of the thermoset resin composition by mass.

9. The thermoset resin composition according to claim 1, characterized in that said thermoset composition further comprises catalyst and/or solvent.

10. The thermoset resin composition according to claim 9, characterized in that said catalysts are selected from the group consisting of one or mixture of at least two of tertiary amine, tertiary phosphine, quaternary ammonium salt, quaternary phosphinium salt and imidazole compounds, optionally, said tertiary amine is selected from the group consisting of one or mixture of at least two of triethyl amine, tributyl amine, dimethyl amine ethanol, N,N-dimethyl-pyridine amine and benzyl dimethyl amine, optionally, said tertiary phosphine is selected from the group consisting of triphenyl phosphine and trialkyl phosphine, optionally, said quaternary ammonium salt is selected from the group consisting of any one or a mixture of at least two of tetramethyl ammonium bromide, tetramethyl ammonium chloride, tetramethylammonium iodide, benzyltrimethylammonium chloride, benzyltriethyl ammonium chloride and ef-cetyl trimethylammonium bromide, optionally, said quaternary phosphinium salt is selected from the group consisting of any one or a mixture of at least two of tetrabutylphosphonium chloride, tetrabutyl phosphonium bromide, tetrabutyl phosphonium iodide, tetraphenylphosphonium chloride, tetraphenyl phosphonium bromide, tetraphenyl phosphonium iodide, ethyl triphenyl phosphine chloride, propyl triphenyl phosphine chloride, propyl triphenyl phosphonium bromide, propyl triphenyl phosphonium iodide, butyl triphenyl phosphine chloride, butyl triphenyl phosphonium bromide and butyl triphenyl phosphonium iodide, optionally, said imidazole compounds are selected from the group consisting of any one or a mixture of at least two of 2-methylimidazole, 2-ethyl-4-methylimidazole, 2-phenyl imidazole, 2-undecyl imidazole, 1-benzyl-2-methylimidazole, 2-heptadecyl imidazole, 2-isopropyl imidazole, 2-phenyl-4-methylimidazole, 2-dodecyl imidazole and cyanoethyl-2-methylimidazole, optionally, said catalyst comprises 0.001~5.0 wt % of the thermoset resin composition by mass.

11. The thermoset resin composition according to claim 9, characterized in that said solvent is selected from the group consisting of one or a combination of at least two of ketones, hydrocarbons, ethers, esters and aprotic solvents.

12. The thermoset resin composition according to claim 1, characterized in that said thermoset resin composition further comprises any one or a mixture of at least two of polyphenylene oxide, cyanate resin or BT resin, optionally, said cyanate resin is prepared by any one or a mixture of at least two of the following monomers, or any one or a mixture of at least two of prepolymer of the following monomers, or a mixture of any one or a mixture of at least two of the following monomers and any one or a mixture of at least two of prepolymer of the following monomers: the monomers are bisphenol A cyanate, 2,2-di(cyanotophenyl)propane, di(cyanotophenyl)ethane, di(cyanotophenyl) methane, di(4-cyanoto-3,5-dimethyl phenyl) methane, 2,2-di(4-cyanoto phenyl) hexafluoro propane, di(4-cyanotophenyl)thioether, phenol novolac cyanate or cyanate containing dicyclopentadiene structure.

13. The thermoset resin composition according to claim 1, characterized in that said thermoset resin composition further comprises any one or mixture of at least two of dye, pigment, surfactant, flatting agent, or ultraviolet absorber.

14. The thermoset resin composition according to claim 1, which is used in preparation of resin sheet, resin coated metal or prepreg.

15. The thermoset resin composition according to claim 14, wherein the resin sheet, resin coated metal or prepreg is applied in preparation of laminate, metal clad laminate and printed wiring board.

* * * * *